(12) United States Patent
Marupaduga et al.

(10) Patent No.: US 10,772,103 B1
(45) Date of Patent: Sep. 8, 2020

(54) ALLOCATING RESOURCES TOWARDS SU-MIMO AND MU-MIMO WIRELESS DEVICES

(71) Applicant: Sprint Spectrum LP, Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/380,035

(22) Filed: Apr. 10, 2019

(51) Int. Cl.
*H04W 72/04* (2009.01)
*H04B 7/0452* (2017.01)

(52) U.S. Cl.
CPC ...... *H04W 72/0486* (2013.01); *H04B 7/0452* (2013.01)

(58) Field of Classification Search
CPC . H04W 64/006; H04W 24/02; H04W 72/048; H04W 72/0486; H04W 92/10; H04W 8/24; H04W 64/00; H04W 72/04; H04B 7/04; H04B 7/0452; H04B 7/0413; H04B 7/024
See application file for complete search history.

(56) References Cited

U.S. PATENT DOCUMENTS

| | | | | |
|---|---|---|---|---|
| 9,144,076 | B2* | 9/2015 | Yue | H04W 72/06 |
| 2010/0135177 | A1* | 6/2010 | Liu | H04W 72/1268 |
| | | | | 370/252 |
| 2011/0280197 | A1* | 11/2011 | Brueck | H04B 7/0452 |
| | | | | 370/329 |
| 2013/0128820 | A1* | 5/2013 | Yuan | H04B 17/373 |
| | | | | 370/329 |
| 2013/0259149 | A1* | 10/2013 | Dhakal | H03M 13/1102 |
| | | | | 375/267 |
| 2017/0222710 | A1* | 8/2017 | Eitan | H04B 7/0452 |
| 2019/0165913 | A1* | 5/2019 | He | H04L 5/0094 |

\* cited by examiner

*Primary Examiner* — Benjamin H Elliott, IV (57) ABSTRACT

Allocating resources in a wireless network utilizing SU-MIMO and MU-MIMO modes of operation includes determining an increase in a resource usage of MU-MIMO wireless devices and responsive to the determining, reducing an allocation of resources for one or more SU-MIMO wireless devices. These operations may be performed based on determining that a load level associated with a serving access node rises to meet a threshold.

20 Claims, 4 Drawing Sheets

ALLOCATING RESOURCES TOWARDS SU-MIMO AND MU-MIMO WIRELESS DEVICES

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. Wireless networks may be configured to utilize a single-user multiple-in multiple-out (SU-MIMO) operating mode and/or a multi-user (MU-MIMO) mode. In the SU-MIMO operating mode, multiple data streams are directed towards individual wireless devices. In the MU-MIMO operating mode, the multiple data streams can be directed towards plural wireless devices that are selected to participate in the MU-MIMO operating mode based on the orthogonality of transmission, thereby maximizing resources. MIMO has been identified as one of the promising air interface technologies to address the capacity requirement required demanded by 5G networks. However, when wireless devices do not qualify for MU-MIMO operation (based on, for example, their orthogonality, etc.), usage of SU-MIMO by these wireless devices may limit the resource available for the wireless devices participating in MU-MIMO groups or pairings. In other words, there is a need for balancing available resources between SU-MIMO wireless devices and MU-MIMO wireless devices within one or more sectors of a wireless network, such that the gains from the MU-MIMO mode of operation can be realized.

OVERVIEW

Exemplary embodiments described herein include methods, systems, and processing nodes for allocating resources towards SU-MIMO and MU-MIMO wireless devices based on a resource usage and/or requirement of the MU-MIMO wireless devices. An exemplary method for allocating resources in a wireless network utilizing SU-MIMO and MU-MIMO modes of operation (among others) includes determining an increase in a resource usage of wireless devices participating in a MU-MIMO mode of operation (i.e., MU-MIMO wireless devices) and responsive to the determining, reducing an allocation of resources for one or more wireless devices participating in a single-user MIMO mode of operation (SU-MIMO wireless devices). The MU-MIMO wireless devices and the SU-MIMO wireless devices are attached to an access node configured to deploy a radio air interface with a plurality of resources in the frequency and time domain.

An exemplary system for allocating resources in a wireless network utilizing SU-MIMO and MU-MIMO modes of operation. The system may include a processing node, and a processor coupled to the processing node. The processor can be configured to allocate a first default amount of resources to SU-MIMO wireless devices and allocate a second default amount of resources to MU-MIMO wireless devices. Responsive to determining an increase in a resource requirement of the MU-MIMO wireless devices, the processor allocates a first reduced amount of resources towards the SU-MIMO wireless devices, and a first increased amount of resources towards the MU-MIMO wireless devices.

An exemplary processing node for allocating resources in a wireless network utilizing SU-MIMO and MU-MIMO modes of operation can be configured to perform operations including determining that a load level associated with the access node rises to meet a threshold, responsive to which the processing node monitors resource usage of MU-MIMO wireless devices attached to the access node. Responsive to determining an increase in the resource usage of the MU-MIMO wireless devices, a first allocation of resources towards the MU-MIMO wireless devices is increased.

DETAILED DESCRIPTION

In embodiments disclosed herein, a method for allocating resources in a wireless network utilizing SU-MIMO and MU-MIMO modes of operation (among others) includes determining an increase in a resource usage of wireless devices participating in a MU-MIMO mode of operation (i.e., MU-MIMO wireless devices) and responsive to the determining, reducing an allocation of resources for one or more wireless devices participating in a single-user MIMO mode of operation (SU-MIMO wireless devices). The MU-MIMO wireless devices and the SU-MIMO wireless devices are attached to an access node configured to deploy a radio air interface with a plurality of resources in the frequency and time domain. In an exemplary embodiment, the resources include physical resource blocks (PRBs).

These operations may be performed based on determining that a load level associated with the access node rises to meet a threshold. Since an exemplary access node as described herein comprises a plurality of antennae (or an antenna array) configured to deploy a radio air interface over one or more sectors, the load level may be determined for each sector separately or in combination. The load level of an access node (or sector thereof) may be based on a throughput, or any metric that indicating an availability of resources in the sector. For example, the throughput may be based on a total throughput indicator, an available throughput indicator, a resource usage, average bandwidth consumption, or any other key performance indicator (KPI). For higher loads, more wireless devices can take advantage of the higher downlink speeds provided by MU-MIMO and, for lower loads, resources can be more evenly distributed among all wireless devices within the sector. Determining that the load level of the access node meets or exceeds a threshold can be based on a PRB usage of all wireless devices attached to the access node. In an exemplary embodiment, the load level is based on a PRB usage of wireless devices within at least one or more sectors. Further, the MU-MIMO and SU-MIMO wireless devices are located within the one or more sectors. Responsive to determining that the load level rises to meet the threshold, a PRB usage of the MU-MIMO wireless devices is monitored to determine whether or not it exceeds a threshold, and the allocations of resources towards both MU-MIMO and SU-MIMO wireless devices adjusted accordingly.

Initially, resources may be allocated to each SU-MIMO wireless device and MU-MIMO wireless device as these wireless devices enter the network or sector. For example, the resources are allocated to each SU-MIMO and/or MU-MIMO device from an available pool of resources within a sector deployed by the access node and, when a load of the access node rises to meet a threshold, the resources are re-allocated based on monitoring a usage or number of MU-MIMO wireless devices. In another exemplary embodiment, default amounts of resources may initially be assigned to SU-MIMO modes of operation and MU-MIMO modes of operation. For example, the one or more SU-MIMO wireless devices are allocated a first (i.e. default) amount of PRBs, and reducing the allocation of resources for the one or more SU-MIMO wireless devices comprises allocating a second amount of PRBs to the one or more SU-MIMO wireless devices, the second amount being smaller than the first amount. In exemplary embodiments, the default allocation is based on historic load information. For example, the historic load information can include load information associated with the access node, sectors deployed therefrom, etc. In other words, SU-MIMO wireless devices may be provided with a default allocation of resources based on their historical usage and/or historical resources available at the access node. Similarly, the default allocation of resources for the MU-MIMO wireless devices may be based on historical MU-MIMO gains information, i.e. the recorded gains for various MU-MIMO wireless devices and pair/groups thereof.

In further embodiments described herein, determining the increase in resource usage of MU-MIMO wireless devices comprises determining an increase in one or more of: a number of MU-MIMO wireless devices attached to the access node; a number of MU-MIMO groups; a number of MU-MIMO wireless devices within a MU-MIMO group; or an average number of MU-MIMO wireless devices per MU-MIMO group. Various combinations of these numbers may be used to determine increased (or reduced) MU-MIMO resource usage. Further, given that MU-MIMO pairs (or groups) typically benefit in the downlink transmissions (from, e.g. an access node), such downlink transmissions may be monitored to determine increases or decreases in MU-MIMO resource usage or requirements. Thus, resource allocations towards MU-MIMO wireless devices are increased or reduced responsive to corresponding increases or decreases in resource requirements of said MU-MIMO wireless devices, while at the same time, resource allocations towards SU-MIMO wireless devices are inversely reduced or increased.

Further embodiments described herein include systems for allocating resources in a wireless network utilizing SU-MIMO and MU-MIMO modes of operation. The system may include a processing node, and a processor coupled to the processing node. The processor can be configured to allocate a first default amount of resources to SU-MIMO wireless devices and allocate a second default amount of resources to MU-MIMO wireless devices. Responsive to determining an increase in a resource requirement of the MU-MIMO wireless devices, the processor allocates a first reduced amount of resources towards the SU-MIMO wireless devices, and a first increased amount of resources towards the MU-MIMO wireless devices. Allocating the first reduced amount of resources towards the SU-MIMO wireless devices and the first increased amount of resources towards the MU-MIMO wireless devices can further be performed responsive to determining that a load level associated with the access node rises to meet a threshold. For example, responsive to the load level meeting the threshold, the processing node may begin to monitor the resource requirement of the MU-MIMO wireless devices. Further, the first default amount of resources is allocated based on a historic load level associated with the access node, and the second default amount of resources is allocated based on a historic MU-MIMO gain level associated with the MU-MIMO wireless devices.

Determining the increase in the resource requirement of the MU-MIMO wireless devices comprises determining an increase in one or more of: a number of MU-MIMO wireless devices attached to the access node; a number of MU-MIMO groups; a number of MU-MIMO wireless devices within a MU-MIMO group; or an average number of MU-MIMO wireless devices per MU-MIMO group. A downlink usage or usage requirement of the MU-MIMO wireless devices may also be monitored. Conversely, determining a decrease in the resource requirement of the MU-MIMO wireless devices results in the processing node allocating a first reduced amount of resources towards the MU-MIMO wireless devices, and a second increased amount of resources towards the SU-MIMO wireless devices. The first reduced amount of resources may be equal to the second default amount of resources, or may be reduced incrementally from the first increased amount based on the reduced usage, until the second default amount is reached. Similarly, the second increased amount of resources may be equal to the first default amount of resources, or may be increased incrementally from the first reduced amount based on the reduced usage, until the first default amount is reached.

In further exemplary embodiments, a processing node for allocating resources in a wireless network utilizing SU-MIMO and MU-MIMO modes of operation can be configured to perform operations including determining that a load level associated with the access node rises to meet a threshold, responsive to which the processing node monitors resource usage of MU-MIMO wireless devices attached to the access node. Responsive to determining an increase in the resource usage of the MU-MIMO wireless devices, a first allocation of resources towards the MU-MIMO wireless devices is increased. Further, a second allocation of resources towards SU-MIMO wireless devices may be reduced. The MU-MIMO wireless devices and the SU-MIMO wireless devices share a total amount of resources within a sector of the access node, and determining that the load level associated with the access node rises to meet a threshold is based on a total resource usage of the sector.

Further, these operations may be performed within a time period. The time period can be configurable, in that it can be adjusted by an operator of the wireless network, or by an automated feedback mechanism. For example, time intervals may be defined by the operator as every transmission-time-interval (TTI), every 10 ms, every 1 s, etc. Further, the time period may be dynamically adjusted based on the determined load level. If the load level continues to meet or exceed the threshold, the time period is decreased and, if the load level remains below the threshold, the time period is decreased. These and additional operations are further described with respect to the embodiments depicted in FIGS. 1-4 below.

Figure 1:
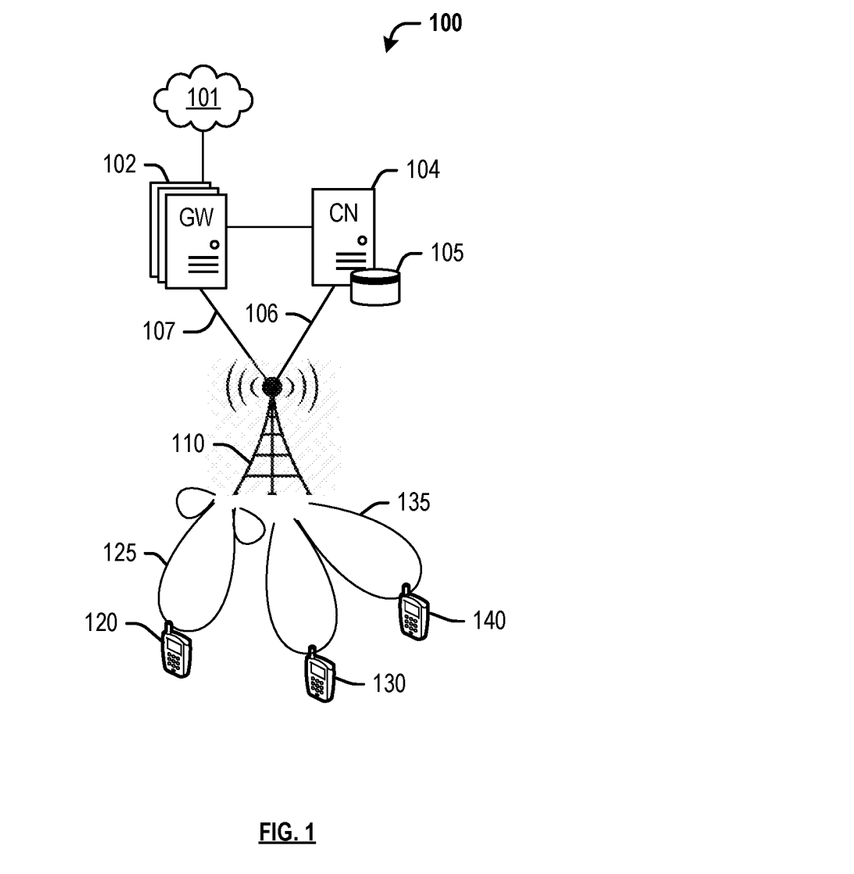
FIG. 1 depicts an exemplary system for allocating resources towards SU-MIMO and MU-MIMO wireless devices.

FIG. 1 depicts an exemplary system 100 for allocating resources between SU-MIMO and MU-MIMO wireless devices in a wireless network. System 100 comprises a communication network 101, gateway node(s) 102, controller node 104, access node 110, and wireless devices 120, 130, 140. Access node 110 can be any network node configured to provide communication between end-user wireless devices 120, 130, 140 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 110 can be a small access node including a microcell access node, a picocell access node, a femtocell access node, or the like such as a home NodeB or a home eNodeB device. Moreover, it is noted that while access node 110 and wireless devices 120, 130, 140 are illustrated in FIG. 1, any number of access nodes and wireless devices can be implemented within system 100.

By virtue of comprising a plurality of antennae as further described herein, access node 110 can implement various transmission modes or operating modes within its coverage area, including multiple-input-multiple-output (MIMO), single user MIMO (SU-MIMO), multi-user MIMO (MU-MIMO), beamforming, etc. In an exemplary embodiment, access node 110 may deploy a first formed beam 125 to wireless device 120, and a second formed beam 135 to wireless devices 130 and 140. For example, first formed beam 125 may be deployed using a SU-MIMO operating mode, and second formed beam 135 may be deployed using an MU-MIMO operating mode. In other words, wireless devices 130 and 140 may be participating in a MU-MIMO group. Wireless devices 130, 140 may qualify for MU-MIMO based on, for instance, an orthogonality of transmission, so as to maximize resources of a loaded access node. In other words, one or more criteria for pairing wireless devices for MU-MIMO (or including the wireless devices into an existing MU-MIMO group) include a channel orthogonality (i.e., non-overlapping and non-interfering channels) above a set threshold, which may be achieved by assigning cyclic shifts allocated to, for example, a Demodulation Reference Signal ("DM-RS") to differentiate parallel data streams, as well as having a SINR above a threshold. Qualifying wireless devices may have an assigned precoder that is orthogonal to other qualifying wireless devices. In an exemplary embodiment, downlink transmission schemes of access node 110 (and/or other access nodes not shown herein) may be supported at a physical layer by a set of downlink reference signals. These reference signals can be specific to wireless devices 120, 130, 140, i.e., DM-RS, or specific to geographical areas of access node 110 or sector 115, i.e., Common Reference Signals ("CRS"). DM-RS' are pre-coded signals used for demodulation purposes on scheduled PRBs. For example, a pre-coding module of access node 110 may apply pre-coding to data transmissions targeted to wireless devices 130, 140 based on channel feedback received from said wireless devices including RI, CQI, and PMI. CRS' are not pre-coded signals and are used by wireless devices 130, 140 for channel estimation. To fully exploit MU-MIMO mode, data/spatial streams intended to/from access node 110 and/or wireless devices 130, 140 need to be well separated and orthogonal at both Tx/Rx sides. Optimal pre-coding for MU-MIMO mode at, for example, a pre-coding module of access node 110, may include Dirty Paper Coding ("DPC") combined with user scheduling and power loading. Additional pre-coding techniques may include Channel Inversion ("CI"), e.g., to cancel interference, and/or Regularized Channel Inversion ("RCI"), e.g., to attenuate interference. To avoid scheduling wireless devices located at, for example, a cell-edge of access node 110, into MU-MIMO mode, a predicted SINR of both the primary and candidate wireless devices at the considered PRB are compared to the set threshold.

Further, access node 110 (or any other entity within system 100) may be configured to execute a method for allocating resources between SU-MIMO wireless device 120 and MU-MIMO wireless devices 130 and 140, by determining an increase in a resource usage of MU-MIMO wireless devices 13 and 140, and based thereon, reducing an allocation of resources for SU-MIMO wireless device 120. These operations may be performed based on determining that a load level associated with the access node 110 rises to meet a threshold. The load level may be based on a throughput, or any metric that indicating an availability of resources in one or more sectors deployed by the access node. For example, the throughput may be based on a total throughput indicator, an available throughput indicator, a resource usage, average bandwidth consumption, or any other key performance indicator (KPI). Determining that the load level of the access node 110 meets or exceeds a threshold can be based on a PRB usage of all wireless devices 120, 130, 140 attached to the access node 110. In an exemplary embodiment, the load level is based on a PRB usage of wireless devices within at least one or more sectors (not shown). Responsive to determining that the load level rises to meet the threshold, a PRB usage of the MU-MIMO wireless devices 130, 140 is monitored to determine whether or not it exceeds a threshold, and the allocations of resources towards both MU-MIMO wireless devices 130, 140 and SU-MIMO wireless device 120 are adjusted accordingly.

In an exemplary embodiment, an initial allocation of resources to each SU-MIMO wireless device 120 and MU-MIMO wireless device 130, 140 may be performed as these wireless devices enter the network or sector, or attach to access node 110. For example, the resources are allocated to each wireless device 120, 130, 140 from an available pool of resources within a sector deployed by the access node 110 and, when a load of the access node rises to meet a threshold, the resources are re-allocated based on monitoring a usage or number of the MU-MIMO wireless devices 130, 140. In another exemplary embodiment, default amounts of resources may initially be assigned to SU-MIMO modes of operation and MU-MIMO modes of operation. For example, SU-MIMO wireless device 120 is allocated a first (i.e. default) amount of PRBs, and reducing the allocation of resources for SU-MIMO wireless device 120 comprises allocating a second amount of PRBs to SU-MIMO wireless device 120, the second amount being smaller than the first amount. In exemplary embodiments, the default allocation is based on historic load information. For example the historic load information can include load information associated with the access node 110, sectors deployed therefrom, etc. In other words, SU-MIMO wireless device 120 may be provided with a default allocation of resources based on its historical usage and/or historical resources available at the access node 110. Similarly, the default allocation of resources for the MU-MIMO wireless devices 120, 130 may be based on historical MU-MIMO gains information, i.e. the recorded gains for MU-MIMO wireless devices 130, 140 and pair/groups thereof.

Further, determining the increase in resource usage of MU-MIMO wireless devices 130, 140 comprises determining an increase in one or more of: a number of MU-MIMO wireless devices attached to the access node; a number of MU-MIMO groups; a number of MU-MIMO wireless devices within a MU-MIMO group; or an average number of MU-MIMO wireless devices per MU-MIMO group. Various combinations of these numbers may be used to determine increased (or reduced) MU-MIMO resource usage. For example, when MU-MIMO wireless device 130 qualifies to join a group/pairing with MU-MIMO wireless device 140, an increase in MU-MIMO resource usage is determined. Further, given that MU-MIMO pairs (or groups) typically benefit in the downlink transmissions (from, e.g. access node 110), such downlink transmissions may be monitored to determine increases or decreases in MU-MIMO resource usage or requirements. Thus, resource allocations towards MU-MIMO wireless devices 130, 140 are increased or reduced responsive to corresponding increases or decreases in resource requirements of said MU-MIMO wireless devices 130, 140, while at the same time, the resource allocation towards SU-MIMO wireless device 120 is inversely reduced or increased.

In another exemplary embodiment, access node 110 is part of a system configured to allocate resources towards SU-MIMO and MU-MIMO wireless devices. For example, system 100 may include a processing node (not shown), and a processor coupled to the processing node. For example, the processing node may be communicatively coupled to access node 110, controller node 104, or any other network node. The processor can be configured to allocate a first default amount of resources to SU-MIMO wireless device 120 and allocate a second default amount of resources to MU-MIMO wireless devices 130, 140. Responsive to determining an increase in a resource requirement of the MU-MIMO wireless devices 130, 140, the processor allocates a first reduced amount of resources towards the SU-MIMO wireless device 120, and a first increased amount of resources towards the MU-MIMO wireless devices 130, 140. Allocating the first reduced amount of resources towards the SU-MIMO wireless device 120 and the first increased amount of resources towards the MU-MIMO wireless devices 130, 140 can further be performed responsive to determining that a load level associated with the access node 110 rises to meet a threshold. For example, responsive to the load level meeting the threshold, the processing node may begin to monitor the resource requirement of the MU-MIMO wireless devices 130, 140. Further, the first default amount of resources is allocated based on a historic load level associated with the access node 110, and the second default amount of resources is allocated based on a historic MU-MIMO gain level associated with the MU-MIMO wireless devices 130, 140.

As described above, determining the increase in the resource requirement of the MU-MIMO wireless devices 130, 140 comprises determining an increase in one or more of: a number of MU-MIMO wireless devices attached to the access node; a number of MU-MIMO groups; a number of MU-MIMO wireless devices within a MU-MIMO group; or an average number of MU-MIMO wireless devices per MU-MIMO group. A downlink usage or usage requirement of the MU-MIMO wireless devices 130, 140 may also be monitored. Conversely, a decrease may be determined in the resource requirement of the MU-MIMO wireless devices 130, 140 based on, for example, determining a decrease in one or more of: a number of MU-MIMO wireless devices attached to the access node; a number of MU-MIMO groups; a number of MU-MIMO wireless devices within a MU-MIMO group; or an average number of MU-MIMO wireless devices per MU-MIMO group. Determining the decrease in the resource requirement of the MU-MIMO wireless devices 130, 140 results in the processing node allocating a first reduced amount of resources towards the MU-MIMO wireless devices 130, 140, and a second increased amount of resources towards the SU-MIMO wireless device 120. The first reduced amount of resources may be equal to the second default amount of resources, or may be reduced incrementally from the first increased amount based on the reduced usage, until the second default amount is reached. Similarly, the second increased amount of resources may be equal to the first default amount of resources, or may be increased incrementally from the first reduced amount based on the reduced usage, until the first default amount is reached.

In further exemplary embodiments, a processing node as described above can be configured to perform operations including determining that a load level associated with the access node 110 rises to meet a threshold, responsive to which the processing node monitors resource usage of MU-MIMO wireless devices 130, 140 attached to the access node 110. Responsive to determining an increase in the resource usage of the MU-MIMO wireless devices 130, 140, a first allocation of resources towards the MU-MIMO wireless devices 130, 140 is increased. Further, a second allocation of resources towards SU-MIMO wireless device 120 may be reduced. The MU-MIMO wireless devices 130, 140 and the SU-MIMO wireless device 120 share a total amount of resources within a sector of the access node 110, and determining that the load level associated with the access node 110 rises to meet a threshold may be based on a total resource usage of the sector.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 120, 130, 140 may be any device, system, combination of devices, or other such communication platform capable of communicating wirelessly with access node 110 using one or more frequency bands deployed therefrom. Wireless devices 120, 130, 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121, 122, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communications links 106, 107 may include 51 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to historic load information and MU-MIMO gains experienced by access node 110 and wireless devices 120, 130, 140. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101.

Figure 2:
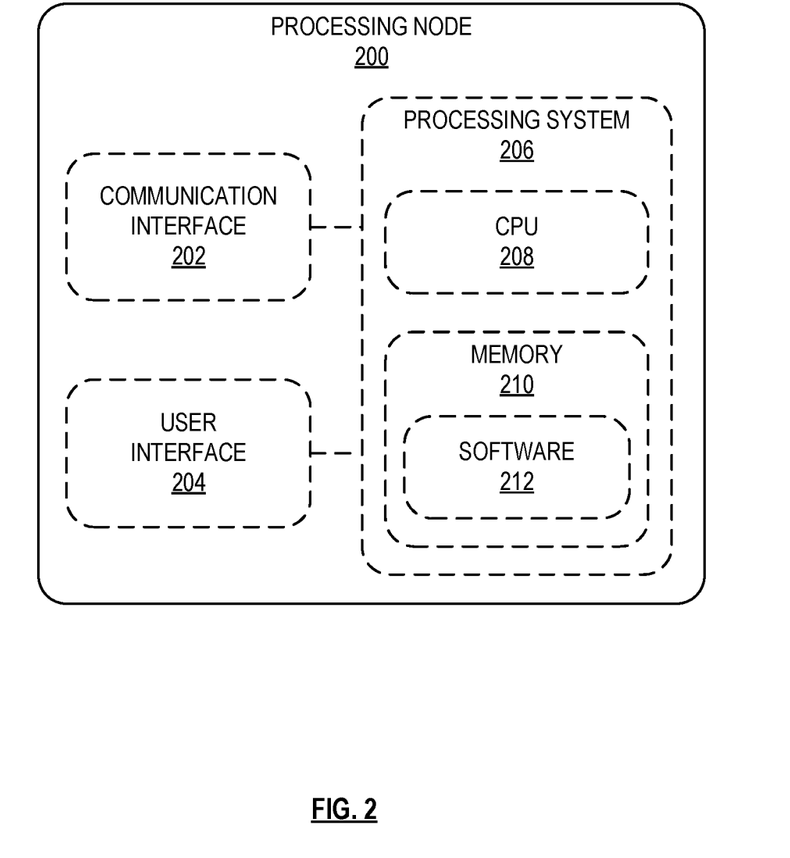
FIG. 2 depicts an exemplary processing node for allocating resources towards SU-MIMO and MU-MIMO wireless devices.

FIG. 2 depicts an exemplary processing node, comprising a communication interface 202, user interface 204, and processing system 206 in communication with communication interface 202 and user interface 204. Processing system 206 includes storage 208, which can comprise a disk drive, flash drive, memory circuitry, or other memory device.

Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include logic for performing the operations described herein. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
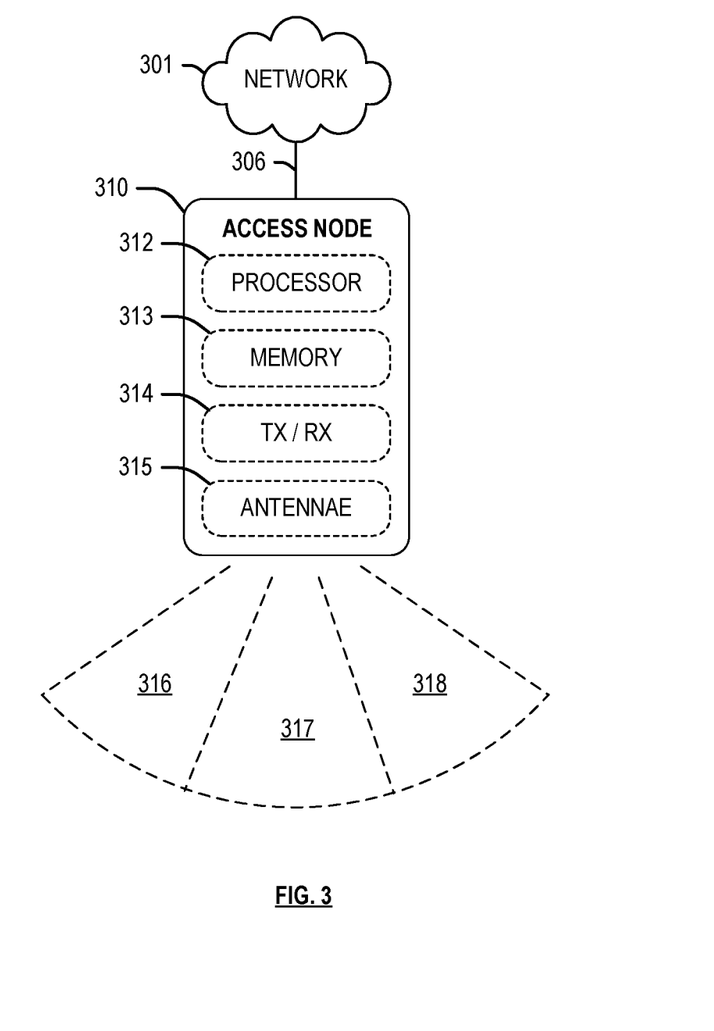
FIG. 3 depicts an exemplary access node for allocating resources towards SU-MIMO and MU-MIMO wireless devices.

FIG. 3 depicts an exemplary access node 310 for performing MU-MIMO in a wireless network. Access node 310 is configured as an access point for providing network services from network 301 to end-user wireless devices such as wireless devices 120, 130, 140 in FIG. 1. Access node 310 is illustrated as comprising a memory 313 for storing logical modules that perform operations described herein, a processor 312 for executing the logical modules, and a transceiver 314 for transmitting and receiving signals via antennae 315. Combination of antennae 315 and transceiver 314 are configured to deploy a radio air interface in one or more sectors 316, 317, 318. Further, in each sector, the antennae 315 may be configured to operate in various operating modes (or transmit data in various transmission mode), such as SU-MIMO, MU-MIMO, beamforming, etc. Similarly, transceivers 314 include a plurality of transceivers that can deploy MU-MIMO or massive MIMO data streams to end-user wireless devices in sectors 316, 317, 318, as well as to facilitate communication with other network nodes on network 301. Further, access node 310 is communicatively coupled to network 301 via communication interface 306, which may be any wired or wireless link as described above.

Figure 4:
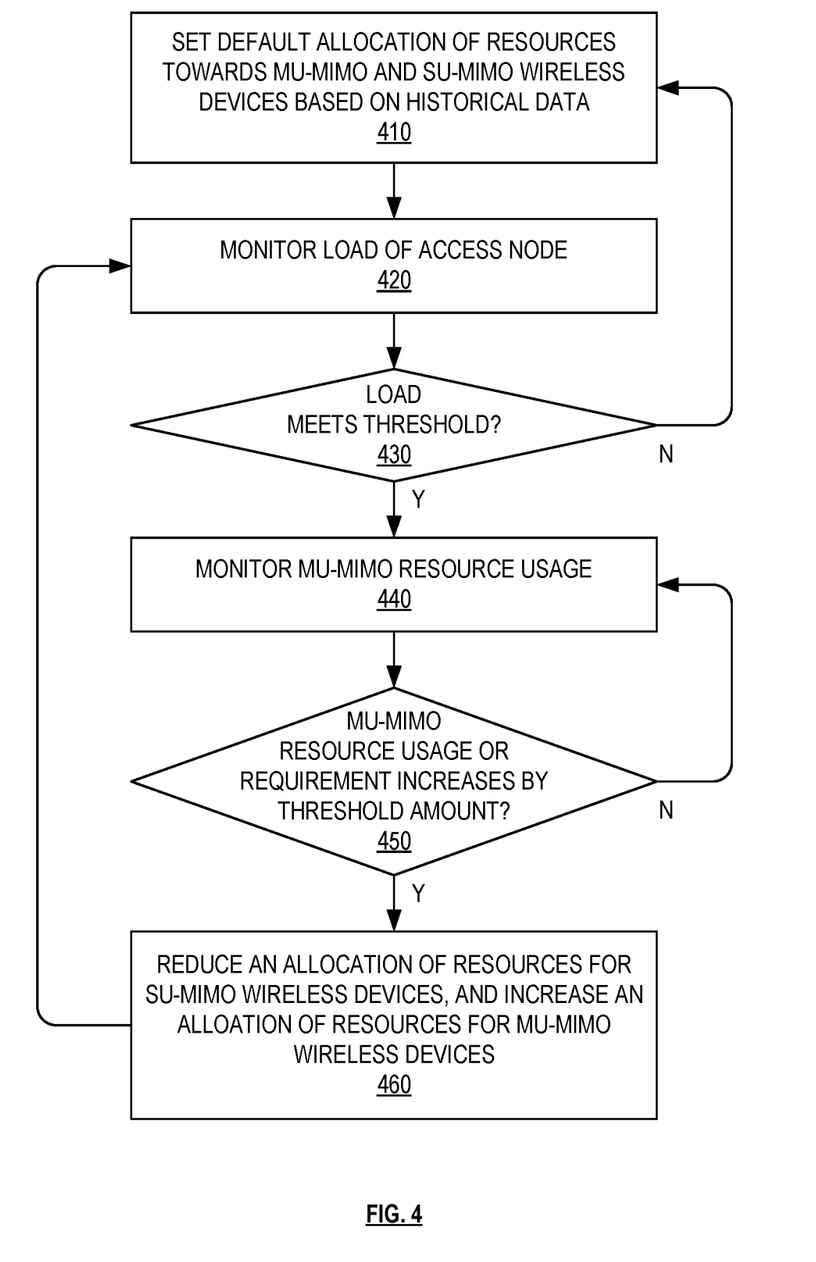
FIG. 4 depicts an exemplary method for allocating resources towards SU-MIMO and MU-MIMO wireless devices.

FIG. 4 depicts an exemplary method for . . . The method of FIG. 4 is illustrated with respect to an access node, such as access node 110, 310. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, an initial resource allocation is made to each SU-MIMO wireless device and MU-MIMO wireless device as these wireless devices enter the network or sector. For example, the resources are allocated to each SU-MIMO and/or MU-MIMO device from an available pool of resources within a sector deployed by the access node. In an exemplary embodiment, default amounts of resources may initially be assigned to SU-MIMO modes of operation and MU-MIMO modes of operation. For example, the one or more SU-MIMO wireless devices are allocated a first (i.e. default) amount of PRBs based on historic load information. For example, the historic load information can include load information associated with the access node, sectors deployed therefrom, etc. In other words, SU-MIMO wireless devices may be provided with a default allocation of resources based on their historical usage and/or historical resources available at the access node. Similarly, the default allocation of resources for the MU-MIMO wireless devices may be based on historical MU-MIMO gains information, i.e. the recorded gains for various MU-MIMO wireless devices and pair/groups thereof.

As described above, the MU-MIMO wireless devices and the SU-MIMO wireless devices are attached to an access node configured to deploy a radio air interface with a plurality of resources in the frequency and time domain. In an exemplary embodiment, the resources include physical resource blocks (PRBs). Thus, at 420 and 430, a load level associated with the access node is monitored to determine whether or not it rises to meet a threshold. Since an exemplary access node as described herein comprises a plurality of antennae (or an antenna array) configured to deploy a radio air interface over one or more sectors, the load level may be determined for each sector separately or in combination. The load level of an access node (or sector thereof) may be based on a throughput, or any metric that indicating an availability of resources in the sector. For example, the throughput may be based on a total throughput indicator, an available throughput indicator, a resource usage, average bandwidth consumption, or any other key performance indicator (KPI). For higher loads, more wireless devices can take advantage of the higher downlink speeds provided by MU-MIMO and, for lower loads, resources can be more evenly distributed among all wireless devices within the sector. Determining that the load level of the access node meets or exceeds a threshold can be based on a PRB usage of all wireless devices attached to the access node. In an exemplary embodiment, the load level is based on a PRB usage of wireless devices within at least one or more sectors. Further, the MU-MIMO and SU-MIMO wireless devices are located within the one or more sectors.

Responsive to determining that the load level rises to meet the threshold, at 440 and 450, a PRB usage of the MU-MIMO wireless devices is monitored to determine whether or not it exceeds a threshold, and the allocations of resources towards both MU-MIMO and SU-MIMO wireless devices adjusted accordingly at 460. Determining the increase in resource usage of MU-MIMO wireless devices at 440 and 450 comprises determining an increase in one or more of: a number of MU-MIMO wireless devices attached to the access node; a number of MU-MIMO groups; a number of MU-MIMO wireless devices within a MU-MIMO group; or an average number of MU-MIMO wireless devices per MU-MIMO group. Various combinations of these numbers may be used to determine increased (or reduced) MU-MIMO resource usage. Further, given that MU-MIMO pairs (or groups) typically benefit in the downlink transmissions (from, e.g. an access node), such downlink transmissions may be monitored to determine increases or decreases in MU-MIMO resource usage or requirements. Thus, resource allocations towards MU-MIMO wireless devices are increased at 460 responsive to corresponding increases in resource requirements of said MU-MIMO wireless devices, while at the same time, resource allocations towards SU-MIMO wireless devices are inversely reduced.

Further, the operations of FIG. 4 and the related embodiments may be performed within a time period. The time period can be configurable, in that it can be adjusted by an operator of the wireless network, or by an automated feedback mechanism. For example, time intervals may be defined by the operator as every transmission-time-interval (TTI), every 10 ms, every 1 s, etc. Further, the time period may be dynamically adjusted based on the determined load level determined at 420 and 430. If the load level continues to meet or exceed the threshold, the time period is decreased and, if the load level remains below the threshold, the time period is decreased.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for allocating resources in a wireless network, the method comprising:
    determining an increase in a resource usage of wireless devices participating in a multi-user MIMO mode of operation (MU-MIMO wireless devices); and
    responsive to the determining, reducing an allocation of resources for one or more wireless devices participating in a single-user MIMO mode of operation (SU-MIMO wireless devices),
    wherein the MU-MIMO wireless devices and the SU-MIMO wireless devices are attached to an access node configured to deploy a radio air interface with a plurality of resources.

2. The method of claim 1, wherein the plurality of resources comprises physical resource blocks (PRBs), the method further comprising:
    determining that a load level associated with the access node rises to meet a threshold; and
    responsive to determining that the load level rises to meet the threshold, monitoring a PRB usage of the MU-MIMO wireless devices.

3. The method of claim 2, wherein determining that the load level rises to meet the threshold is based on a PRB usage of all wireless devices attached to the access node.

4. The method of claim 2, wherein:
    the access node is further configured to deploy the radio air interface over one or more sectors,
    the load level is based on a PRB usage of wireless devices within at least one of the one or more sectors, and
    the MU-MIMO and SU-MIMO wireless devices are located within the at least one of the one or more sectors.

5. The method of claim 1, wherein:
    the plurality of resources comprises physical resource blocks (PRBs),
    the one or more SU-MIMO wireless devices are allocated a first amount of PRBs, and
    reducing the allocation of resources for the one or more SU-MIMO wireless devices comprises allocating a second amount of PRBs to the one or more SU-MIMO wireless devices, the second amount being smaller than the first amount.

6. The method of claim 5, further comprising setting a default allocation of resources for the one or more SU-MIMO wireless devices, the default allocation being based on historic load information.

7. The method of claim 1, further comprising increasing an allocation of resources for the MU-MIMO wireless devices responsive to determining the increase in resource usage.

8. The method of claim 1, wherein determining the increase in resource usage of MU-MIMO wireless devices comprises determining an increase in one or more of: a number of MU-MIMO wireless devices attached to the access node; a number of MU-MIMO groups; a number of MU-MIMO wireless devices within a MU-MIMO group; or an average number of MU-MIMO wireless devices per MU-MIMO group.

9. A system for allocating resources in a wireless network, the system comprising:
    a processing node; and
    a processor coupled to the processing node, the processor being configured to:
        allocate a first default amount of resources to wireless devices attached to an access node and participating in a single-user MIMO mode of operation (SU-MIMO wireless devices);
        allocate a second default amount of resources to wireless devices attached to the access node and participating in a multi-user MIMO mode of operation (MU-MIMO wireless devices);
        responsive to determining an increase in a resource requirement of the MU-MIMO wireless devices, allocating a first reduced amount of resources towards the SU-MIMO wireless devices; and
        responsive to determining the increase in the resource requirement of the MU-MIMO wireless devices, allocating a first increased amount of resources towards the MU-MIMO wireless devices.

10. The system of claim 9, wherein the allocating the first reduced amount of resources towards the SU-MIMO wireless devices and the first increased amount of resources towards the MU-MIMO wireless devices is further performed responsive to determining that a load level associated with the access node rises to meet a threshold, and monitoring the resource requirement of the MU-MIMO wireless devices.

11. The system of claim 9, wherein the first default amount of resources is allocated based on a historic load level associated with the access node.

12. The system of claim 9, wherein the second default amount of resources is allocated based on a historic MU-MIMO gain level associated with the MU-MIMO wireless devices.

13. The system of claim 9, wherein determining the increase in the resource requirement of the MU-MIMO wireless devices comprises determining an increase in one or more of: a number of MU-MIMO wireless devices attached to the access node; a number of MU-MIMO groups; a number of MU-MIMO wireless devices within a MU-MIMO group; or an average number of MU-MIMO wireless devices per MU-MIMO group.

14. The system of claim 9, further comprising:
   determining a decrease in the resource requirement of the MU-MIMO wireless devices; and
   allocating a first reduced amount of resources towards the MU-MIMO wireless devices.

15. The system of claim 14, wherein the first reduced amount of resources is equal to the second default amount of resources.

16. The system of claim 14, further comprising allocating a second increased amount of resources towards the MU-MIMO wireless devices.

17. The system of claim 16, wherein the second increased amount of resource is equal to the first default amount of resources.

18. A processing node for allocating resources in a wireless network, the processing node being configured to perform operations comprising:
   determining that a load level associated with an access node rises to meet a threshold;
   responsive to determining that the load level rises to meet the threshold, monitoring resource usage of wireless devices attached to the access node and participating in a multi-user MIMO mode of operation (MU-MIMO wireless devices); and
   responsive to determining an increase in the resource usage of the MU-MIMO wireless devices, increasing a first allocation of resources towards the MU-MIMO wireless devices.

19. The processing node of claim 18, further comprising decreasing a second allocation of resources towards wireless devices attached to the access node and participating in a single-user MIMO mode of operation (SU-MIMO wireless devices).

20. The processing node of claim 19, wherein:
   the MU-MIMO wireless devices and the SU-MIMO wireless devices share a total amount of resources within a sector of the access node, and
   determining that the load level associated with the access node rises to meet a threshold is based on a total resource usage of the sector.

* * * * *